(12) United States Patent
Cook et al.

(10) Patent No.: US 7,057,376 B2
(45) Date of Patent: Jun. 6, 2006

(54) POWER MANAGEMENT SYSTEM FOR VEHICLES

(75) Inventors: Alexander Cook, Dublin, OH (US); Alexander Isurin, Dublin, OH (US); Philip Warwick Irwin, Dublin, OH (US)

(73) Assignee: Vanner, Inc., Hilliard, OH (US)

( * ) Notice: Subject to any disclaimer, the term of this patent is extended or adjusted under 35 U.S.C. 154(b) by 0 days.

(21) Appl. No.: 11/035,831

(22) Filed: Jan. 14, 2005

(65) Prior Publication Data

US 2005/0151517 A1 Jul. 14, 2005

Related U.S. Application Data

(60) Provisional application No. 60/536,328, filed on Jan. 14, 2004.

(51) Int. Cl.
G05F 1/70 (2006.01)

(52) U.S. Cl. .................................... 323/207
(58) Field of Classification Search ............... 323/205, 323/207, 9.1; 307/9.1, 52; 290/52, 40 B, 290/40 R
See application file for complete search history.

(56) References Cited

U.S. PATENT DOCUMENTS

| | | | |
|---|---|---|---|
| 4,317,165 A | 2/1982 | Sullivan | |
| 4,455,585 A | 6/1984 | Murari et al. | |
| 4,458,195 A | 7/1984 | Piteo | |
| 4,479,083 A | 10/1984 | Sullivan | |
| 4,855,888 A | 8/1989 | Henze et al. | |
| 4,992,920 A | 2/1991 | Davis | |
| 5,157,593 A | 10/1992 | Jain | |
| 5,373,196 A | 12/1994 | Faley | |
| 5,452,197 A | 9/1995 | Rice | |
| 5,777,864 A | 7/1998 | Seong et al. | |
| 5,982,142 A | 11/1999 | Sullivan et al. | |
| 6,154,375 A | 11/2000 | Majid et al. | |
| 6,175,311 B1 * | 1/2001 | Li | 340/657 |
| 6,353,304 B1 * | 3/2002 | Atcitty et al. | 320/116 |
| 6,483,731 B1 | 11/2002 | Isurin et al. | |
| 6,624,533 B1 * | 9/2003 | Swanson et al. | 307/64 |
| 6,717,291 B1 | 4/2004 | Purkey | |
| 6,724,100 B1 * | 4/2004 | Gabriel | 307/9.1 |
| 6,812,586 B1 * | 11/2004 | Wacknov et al. | 290/52 |

OTHER PUBLICATIONS

A. Isurin, A.Cook, A Novel Resonant Converter Topology and its Application, IEEE Power Electronics Specialists Conference, PESC 2001, vol. 2, pp. 1039-1044, Vancouver, BC, Canada, Jun. 2001.

(Continued)

*Primary Examiner*—Adolf Berhane
(74) *Attorney, Agent, or Firm*—James R. Eley; Michael A. Forhan; Eley Law Firm Co.

(57) ABSTRACT

A power management system for a vehicle. The system may be flexibly configured using various arrangements of DC to AC inverters, DC to DC converters AC to DC converters, DC to AC converters and AC to AC converters, one or more batteries, and a control portion to provide an AC bus, a primary DC bus and a secondary DC bus. The control portion monitors the status of the buses, inverters and converters and controls the operation of the inverters and converters to supply and regulate the power supplied by the buses. The inverters and converters may be bidirectional, allowing power to be transferred between buses.

20 Claims, 7 Drawing Sheets

OTHER PUBLICATIONS

R. Oruganti, P.C. Heng, J.T.K. Guan, L. A. Choy, Soft-Switched DC/DC Converter with PWM Control, IEEE Transactions on Power Electronics, vol. 13, No. 1, Jan. 1998, pp. 102-113.

G. S. N. Raju, s. Doralda, An LCL Resonant Converter with PWM Control-Analysis, Simulation, and Implementation, IEEE Transactions on Power Electronics, vol. 10, No. 2, Mar. 1995, pp. 164-173.

H. Li, F.Z. Peng, J. Lawler, Modeling, Simulation, and Experimental Verification of Soft-Switched Bi-Directional DC-DC Converters, IEEE Applied Power Electronics Conference and Exposition, APEC 2001, vol. 2, pp. 736-744, Anaheim, CA, Mar. 2001.

N.H. Li, F.Z. Peng, J.S. Lawer, A Natural ZVS Medium-Power Bidirectional DC-DC Converter With Minimum Number of Devices, IEEE Transactions on Industry Applications, vol. 39, No. 2, Mar./Apr. 2003, pp. 525-535.

O. Q. Zhao, Fred C. Lee, High-Efficiency, High Step-Up DC-DC Converters, IEEE Transactions on Power Electronics, vol. 18, No. 1, Jan. 2003, pp. 65-73.

M. Ishida, H. Fujino, T. Hori, Real-Time Output Voltage Control Method of Quasi-ZCS Series Resonant HF-Linked DC-AC Converter, IEEE Transactions on Power Electronics, vol. 10, No. 6, Nov. 1995, pp. 776-783.

G. C. Hsieh, C. H. Lin, J. M. Li, Y. C. Hsu, A Study of Series-Resonant DC/AC Inverter, IEEE Transactions on Power Electronics, vol. 11, No. 4, Jul. 1996, pp. 641-652.

I. Batarseh, Resonant Converter Topologies with Three and Four Energy Storage Elements, IEEE Transactions on Power Electronics, vol. 9, No. 1, Jan. 1994, pp. 64-73.

J. L. Lin, J. S. Lew, Robust Controller Design for a Series Resonant Converter Via Duty-Cycle Control, IEEE Transactions on Power Electronics, vol. 14, No. 5, Sep. 1999, pp. 793-801.

* cited by examiner

POWER MANAGEMENT SYSTEM FOR VEHICLES

This application claims priority to U.S. provisional application 60/536,328, filed Jan. 14, 2004, the contents of which are hereby incorporated by reference.

FIELD

This invention relates to a system for providing and controlling electric power. In particular, this invention relates to power management of a vehicle electrical power system.

BACKGROUND

A typical vehicle power system consists of a battery, an alternator to charge the battery and to augment power supplied by the battery, and one or more distribution buses to power a variety of loads connected to the system. In such arrangements there is usually only a single degree of control wherein the field voltage of the alternator is controlled to regulate the output of the alternator and in turn regulate the voltage of the power distribution bus, which is usually on the order of about 14 volts DC or 28 volts DC. This has two primary effects. Firstly, the alternator must operate at a voltage compatible with the battery, even if most of the power provided by the alternator is consumed by a load that is configured to optimally operate at a different supply voltage. In addition, the battery voltage is necessarily the same as the distribution bus voltage regardless of the battery's temperature or state of charge, causing degradation of the battery and reducing its useful life. Further, the charging and discharging of the battery is relatively uncontrolled.

In addition to DC power, portable alternating current ("AC") power is a desired resource for many specialized vehicles. For example, emergency vehicles may require AC power to operate medical equipment carried on board the vehicle. AC power is likewise used in utility and construction vehicles to operate tools and equipment. Another common use for vehicle-based AC power is in long-haul transport tractor-trailer trucks having a sleeper compartment wherein AC power may be used to operate convenience accessories such as electric razors, televisions and microwaves. Similarly, recreational camping vehicles ("RVs") use AC power to operate the various household accessories installed in the RV as well as those that may be carried by the passengers.

Static inverters are commonly used to generate portable AC electrical power from a DC power source. Such inverters are relatively lightweight and have no moving parts to wear out. In addition, inverters do not require a fueled engine such as the vehicle's prime mover to produce power, are quiet, and do not produce fumes. Inverters are also more efficient than comparable power sources, such as motor-driven generators. However, inverters suffer from a limitation in that their output power, measured in volt-amps ("VA") or watts, may be constrained under some conditions. For example, an inverter that derives its input power from a vehicle's alternator system may not be able to deliver the full amount of electrical power demanded by a load when the vehicle is at idle since the power delivery capacity of an alternator varies directly with the vehicle's engine speed.

Aside from the need to generate AC power there is a desire on the part of many vehicle manufacturers to increase the "electrification" of vehicles, i.e., reducing the number of accessories that depend directly on the fueled-engine as a mechanical prime mover. Example accessories include power steering pumps, hydraulic drives, engine cooling fans, air conditioning compressors, oil and coolant pumps, and air compressors. Advantages of accessory electrification include a reduction in engine loading, which facilitates greater engine performance, increased flexibility in locating and mounting the accessories in the vehicle, reduced fuel consumption, more efficient accessory operation made possible by optimizing the location and wiring of the accessories, and reduced vehicle emissions corresponding to reduced engine loading and fuel consumption.

Some vehicles may have several battery power supplies. For example, a vehicle may have a first battery system for operating a starter to "crank," or start, the engine and a second battery system for powering accessories. The discharge and load characteristics can vary considerably between the cranking and accessory batteries. For example, the cranking batteries are intended to provide high current for a relatively short period of time to start the engine, while the accessory batteries are used to provide a smaller amount of current to the vehicle's accessories for a relatively long period of time. The types of batteries used for cranking and for powering accessories may also differ. For example, a cranking battery may use flooded lead-acid batteries while the accessory battery may use deep-cycle absorbed glass mat ("AGM") batteries. Each type of battery can have differing charge requirements, as well.

There is a need for an improved way to control battery charging to an amount appropriate for each battery in a vehicle electrical system having multiple batteries. There is a further need for an improved way to control and route power between multiple power supplies and distribution buses in a vehicle in order to supply and augment the buses and charge the batteries.

SUMMARY

An improved power management system for a vehicle is disclosed. The system may be flexibly configured using various arrangements of DC to AC inverters, DC to DC converters AC to DC converters, DC to AC converters and AC to AC converters, one or more batteries, and a control portion to provide an AC bus, a primary DC bus and a secondary DC bus. The control portion monitors the status of the buses, inverters and converters and controls the operation of the inverters and converters to supply and regulate the power supplied by the buses. The inverters and converters may be bidirectional, allowing power to be transferred between buses.

The system comprises a high-voltage DC bus, a DC to AC inverter connected between the high-voltage DC bus and an AC bus, and a DC to DC converter connected between the high-voltage DC bus and a battery. The DC to DC converter and the battery are further connected to a DC bus and to a control portion. The control portion is responsive to the status of at least one of the high-voltage DC bus, DC to AC inverter, AC bus, DC to DC converter, battery and primary DC bus. The control portion in turn controls the operation of at least one of the DC to AC inverter and the DC to DC converter to supply and/or regulate at least one of the voltage and current of at least one of the AC bus and DC bus.

Another aspect of the present invention is an improved power management system for a vehicle. The system comprises a high-voltage DC bus, a DC to AC inverter connected between the high-voltage DC bus and an AC bus, and a first DC to DC converter connected between the high-voltage DC bus and a battery. The first DC to DC converter and the battery are further connected to a primary DC bus. A second DC to DC converter is connected between the primary DC bus and a secondary DC bus. The system also includes a control portion. The control portion is responsive to the status of at least one of the high-voltage DC bus, DC to AC inverter, AC bus, first DC to DC converter, battery, primary DC bus, second DC to DC converter and secondary DC bus. The control portion in turn controls the operation of at least one of the DC to AC inverter, first DC to DC converter and second DC to DC converter to supply and/or regulate at least one of the voltage and current of at least one of the AC bus, primary DC bus and secondary DC bus.

Still another aspect of the present invention is another configuration of an improved power management system for a vehicle. The system comprises a high-voltage DC bus, a DC to AC inverter connected between the high-voltage DC bus and an AC bus, and a first DC to DC converter connected between the high-voltage DC bus and a first battery. The first DC to DC converter and the first battery are further connected to a primary DC bus. A second DC to DC converter is connected between the primary DC bus and a second battery. The second DC to DC converter and the second battery are further connected to a secondary DC bus. The system also includes a control portion. In this embodiment the control portion is responsive to the status of at least one of the high-voltage DC bus, DC to AC inverter, AC bus, first DC to DC converter, first battery, primary DC bus, second DC to DC converter, second battery and secondary DC bus. The control portion in turn controls the operation of at least one of the DC to AC inverter, first DC to DC converter and second DC to DC converter to supply and/or regulate at least one of the voltage and current of at least one of the AC bus, primary DC bus and secondary DC bus.

Yet another aspect of the present invention is another configuration of an improved power management system for a vehicle. The system comprises an AC to AC converter connected between an AC power source and an AC bus, and an AC to DC converter connected between the AC bus and a first battery. The AC to DC converter and the first battery are further connected to a primary DC bus. A DC to DC converter is connected between the primary DC bus and a second battery. The DC to DC converter and the second battery are further connected to a secondary DC bus. The system also includes a control portion. The control portion is responsive to the status of at least one of the AC power source, AC to AC converter, AC bus, AC to DC converter, first battery, primary DC bus, DC to DC converter, second battery, and secondary DC bus. The control portion in turn controls the operation of at least one of the AC to AC converter, AC to DC converter, and DC to DC converter to supply and/or regulate at least one of the voltage and current of at least one of the AC bus, primary DC bus and secondary DC bus.

Still another aspect of the present invention is yet another configuration of an improved power management system for a vehicle. The system comprises a DC to AC inverter connected between a DC power source and an AC bus, and a first battery connected to the DC power source. The first battery is further connected to a primary DC bus. A DC to DC converter is connected between the primary DC bus and a second battery. The DC to DC converter and the second battery are further connected to a secondary DC bus. The system also includes a control portion. The control portion is responsive to the status of at least one of the DC power source, DC to AC inverter, AC bus, first battery, primary DC bus, DC to DC converter, second battery and secondary DC bus. The control portion in turn controls the operation of at least one of the DC to AC inverter and the DC to DC converter to supply and/or regulate at least one of the voltage and current of at least one of the AC bus, primary DC bus and secondary DC bus.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1A:
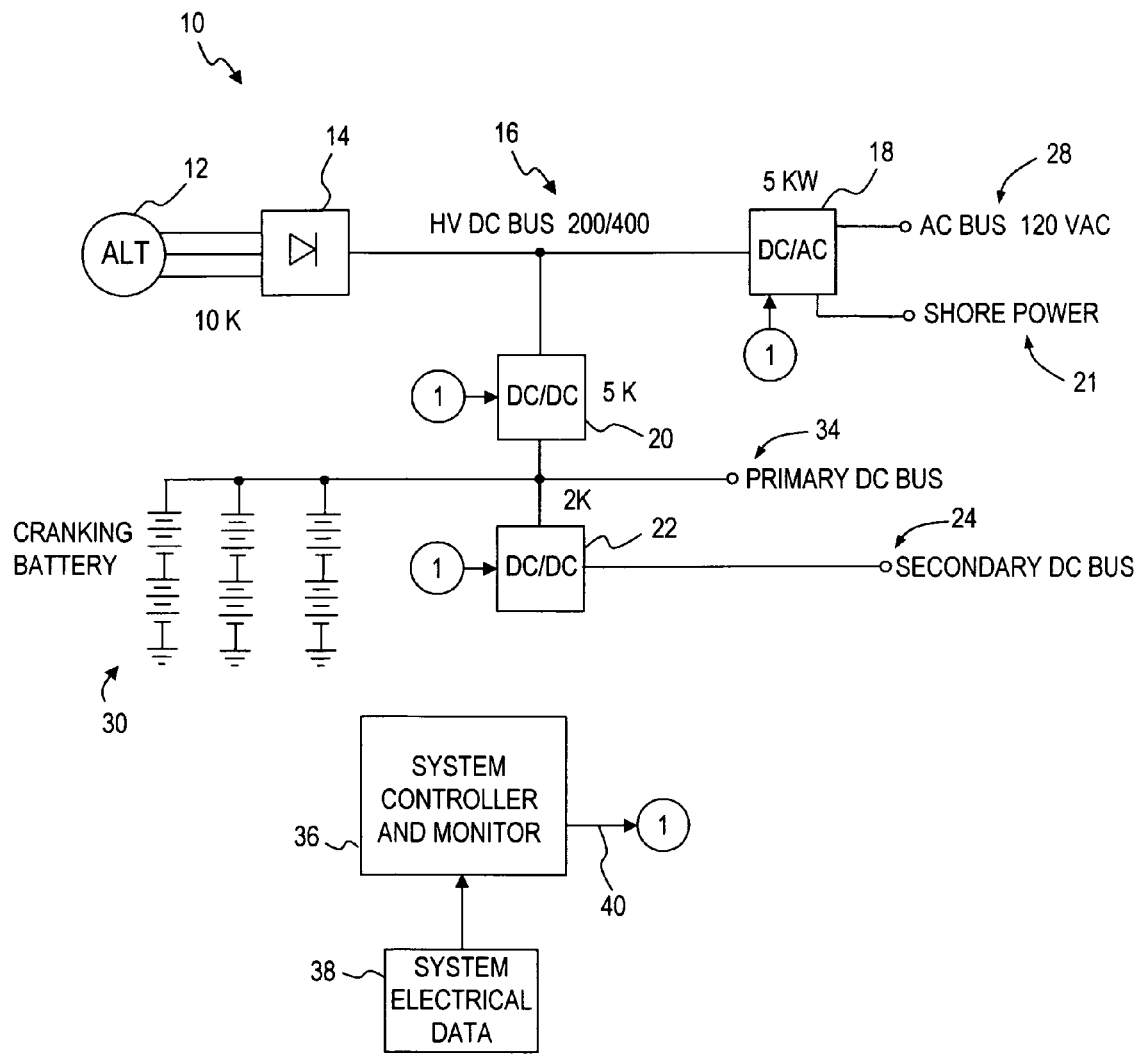
FIG. 1A is a schematic block circuit diagram of a power management system having a power conversion topology according to an embodiment of the present invention.

In the discussion that follows and in the accompanying figures, like reference numerals are used to indicate components having substantially the same structure or function. In addition, in the figures, a numeral within a circle indicates a common point of connection for an attached structure or functional block. For example, each component in a figure having a connection to or from an encircled (1) are logically and/or electrically connected together.

The present invention comprises varying configurations of a vehicle power management system as discussed below and shown in the accompanying figures. The preferred configuration of the power management system for a particular vehicle depends upon the type and quantity of input power available and the output power requirements for the vehicle.

With reference to FIG. 1A, an improved power management system 10 is depicted according to an embodiment of the present invention. High-voltage AC generated by an alternator 12 is rectified to DC by a rectifier 14, forming a high voltage DC bus 16. A high voltage alternator 12 and bus 16 is preferable for increased alternator efficiency and for voltage-changing flexibility during subsequent power conversion. A DC to AC ("DC/AC") inverter 18 receives input voltage from high voltage bus 16 and converts the input DC voltage to an AC voltage to power vehicle accessories connected to an AC bus 28. A first DC to DC ("DC/DC") converter 20 receives input power from high voltage bus 16 and converts the input power to a predetermined output voltage with a predetermined current capacity. The output of converter 20 forms a primary bus 34 in conjunction with a battery 30 to power devices connected to the primary bus, such as a starter for the vehicle's engine. A second DC/DC converter 22 receives input power from primary bus 34 and converts the input power to a predetermined voltage and current capacity. The output of converter 22 forms a lower-voltage secondary bus 24 to provide power to devices connected to the secondary bus, such as accessories.

A system controller and monitor 36 monitors system data 38 relating to the operational status of various portions of system 10, i.e., voltage and current at the various sub-system inputs and outputs, including, but not limited to, alternator 12, high voltage bus 16, primary bus 34, secondary bus 24, AC bus 28, DC/AC converter 18, DC/DC converters 20, 22 and battery 30. System data 38 may further include data relating to system faults, commands from an external source, such as user input controls, and so on. Controller 36 is responsive to the system data 38 in a predetermined manner to control the operation of inverter 18 and converters 20, 22 to regulate at least one of the voltage and current of at least one of the AC bus 28, primary bus 34 and secondary bus 24, and to charge battery 30. In this configuration primary bus 34 preferably provides power for high-power loads such as the starter motor of the vehicle's engine, while secondary bus 24 provides power to relatively low-power systems, such as an engine control unit ("ECU"), for example.

Inverter 18 may directly convert the high voltage DC of bus 16 to a corresponding high voltage AC without the need for a step-up transformer, thus reducing system weight and cost. Inverter 18 must be rated at the full AC output specification, since the inverter is the only source of AC power output. For example, if 10 kW of AC output power is required from system 10, inverter 18 must be configured with a large enough capacity to supply the entire 10 kW. Inverter 18 may be bidirectional and thus additionally capable of converting externally-supplied AC power (i.e., shore power 21) to a high voltage DC and supplying the high voltage DC to bus 16. Thus, an external input AC voltage to inverter 18 may be rectified and supplied to high voltage bus 16. DC/DC converter 20 may, in turn, utilize this energy to charge battery 30, supply primary bus 34 and supply power to secondary bus 24 through DC/DC converter 22 during times when power from alternator 12 is unavailable, such as when the vehicle's engine is not operating.

DC/DC converter 20 receives input power from high voltage bus 16 and converts the input power to a voltage and current suitable for charging battery 30 and providing power to high-power accessories connected to primary bus 34. DC/DC converter 20 may be bidirectional, thus additionally capable of augmenting alternator 12 by converting power from battery 30 (and/or an external source of power connected to primary bus 34) to a high voltage compatible with high voltage bus 16 during periods of high load demand on inverter 18. The amount of available additional power supplied to bus 16 by DC/DC converter 20 is limited by the capacity of the DC/DC converter. For example, if a 15 kW inverter 18 is supplied by a 10 kW alternator 12, a 5 kW DC/DC converter 20 is required to supply the additional power needed for the inverter to operate at its full capacity. This configuration also allows at least limited operation of power management system 10 from battery 30 when power is not being supplied by alternator 12.

DC/DC converter 22 receives input power from primary bus 34 and converts the input power to a predetermined output voltage and current capacity. The output forms secondary DC bus 24. Secondary bus 24 may be a lower voltage that primary bus 34, and may or may not be augmented by a battery (not shown). Secondary bus 24 preferably provides power to relatively low-power systems, such as an ECU, for example.

Figure 1B:
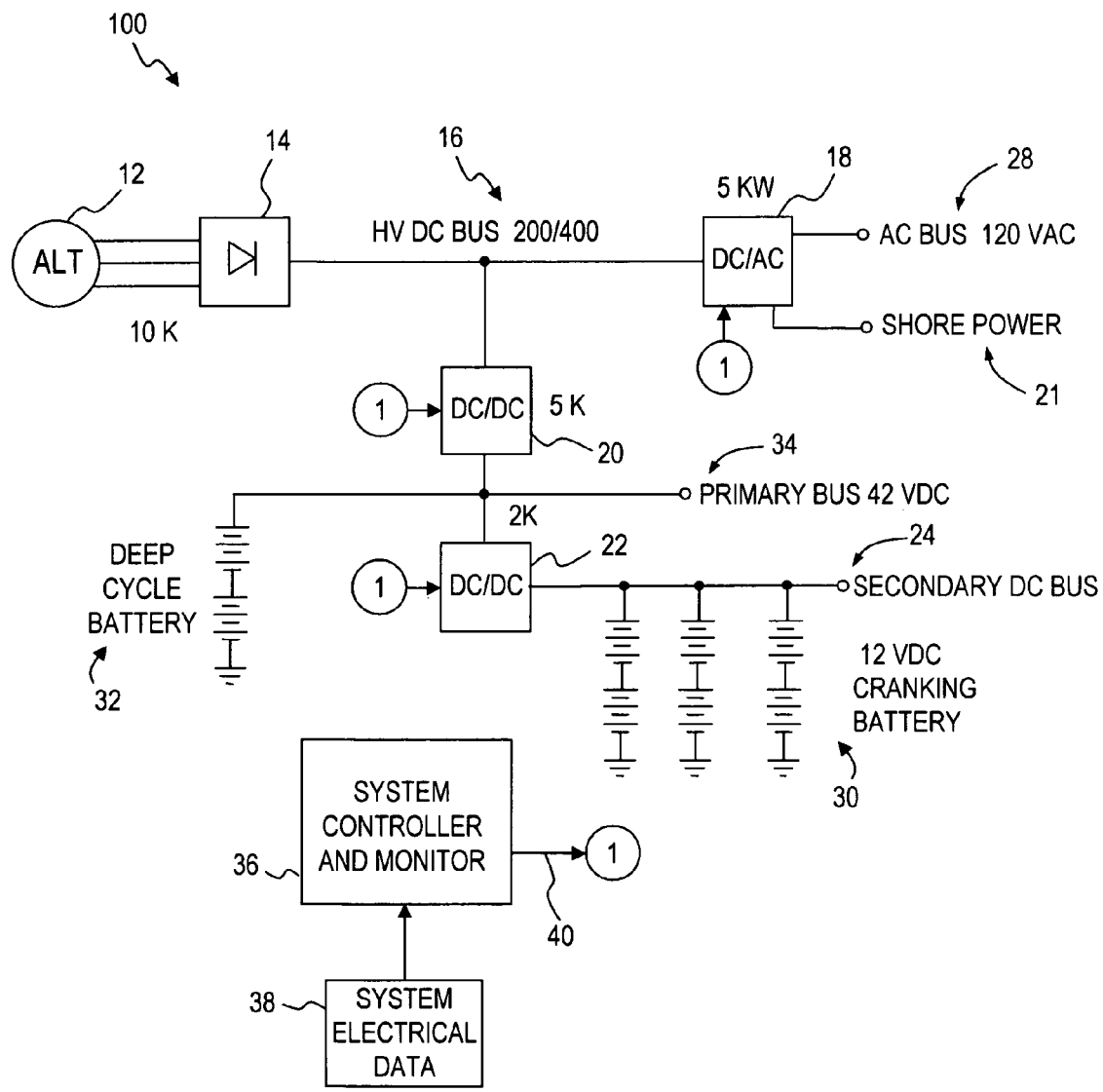
FIG. 1B is a schematic block circuit diagram of a power management system having a power conversion topology according to another embodiment of the present invention.

With reference now to FIG. 1B, a power management system 100 is shown according to an embodiment of the present invention. High-voltage AC generated by an alternator 12 is rectified to DC by a rectifier 14, forming a high voltage DC bus 16. A high voltage is preferable for increased alternator efficiency and for voltage-changing flexibility during subsequent power conversion. A DC/AC inverter 18 receives input power from high voltage bus 16 and converts the DC input power to a predetermined AC voltage and current capacity to power vehicle accessories connected to an AC bus 28. A first DC/DC converter 20 receives input power from high voltage bus 16 and converts the input power to a predetermined DC output voltage and current capacity corresponding to the operating voltage and rated current of one or more loads powered by a primary bus 34. Primary bus 34 is formed by the output of DC/DC converter 20 in conjunction with a first battery 32 to provide power to the loads connected to the primary bus, such as accessories. A second DC/DC converter 22 receives input power from primary bus 34 and converts the input power to a voltage and current output suitable for charging a second battery 30 connected thereto and providing power to secondary bus 24 to power devices connected to the secondary bus, such as a starter for the vehicle's engine.

A system controller and monitor 36 monitors system data 38 relating to the operational status of various portions of system 100, i.e., voltage and current at the various sub-system inputs and outputs, including, but not limited to, alternator 12, high voltage bus 16, primary bus 34, secondary bus 24, AC bus 28, DC/AC converter 18, DC/DC converters 20, 22 and batteries 30, 32. System data 38 may further include data relating to system faults, external commands, and so on. Controller 36 responds to the system data 38 in a predetermined manner to control the operation of inverter 18 and converters 20, 22 to regulate at least one of the voltage and current of at least one of the AC bus 28, primary bus 34 and secondary bus 24, and charge batteries 30, 32. In system 100 a higher-voltage primary bus 34 preferably powers engine accessories while engine cranking power is supplied by a lower-voltage secondary bus 24.

Inverter 18 may directly convert the high voltage DC of bus 16 to a corresponding high voltage AC without the need for a step-up transformer, thus reducing system weight and cost. Inverter 18 is preferably rated at the full AC output specification since the inverter is the only source of AC power output. For example, if a maximum of 10 kW of AC output power is required from system 10, inverter 18 should have the capacity to supply the entire 10 kW. Inverter 18 may be bidirectional and thus additionally capable of converting externally-supplied AC power (i.e., shore power 21) to a high voltage DC and supplying the high voltage DC to bus 16. DC/DC converter 20 may in turn utilize this energy to charge first battery 32 and provide power to primary bus 34. DC/DC converter 22 may likewise utilize shore power 21 by receiving the power through DC/DC converter 20 to charge second battery 30 and power secondary bus 24. Shore power 21 thus allows operation of power management system 100 during times when power from alternator 12 is unavailable.

DC/DC converter 20 may be bidirectional, thus additionally capable of augmenting alternator 12 by converting power from battery 32 (and/or an external source of power connected to the primary bus 34) to a high voltage compatible with high voltage bus 16 during periods of high load demand on inverter 18. The amount of available additional power supplied to bus 16 by DC/DC converter 20 is limited by the capacity of the DC/DC converter. For example, if a 15 kW inverter 18 is supplied by a 10 kW alternator 12, a 5 kW DC/DC converter 20 is required to supply the additional power needed for the inverter to operate at its full capacity. This configuration also allows at least limited operation of power management system 100 from battery 32 when power is not being provided by alternator 12.

DC/DC converter 22 may also be bidirectional and thus additionally capable of augmenting power available to primary bus 34 by converting power from battery 30 (and/or an external source of power connected to the primary bus) to a voltage compatible with the primary bus and providing the converted voltage to the primary bus. DC/DC converter 22 may also indirectly supply power to high voltage bus 16 through DC/DC converter 20 in the manner previously described, thus supporting operation of inverter 18.

With continued reference to FIG. 1A, if only one DC bus is needed power management system 10 may be configured to omit DC/DC converter 22 and secondary bus 24. In this configuration all high-power devices, such as a starter for the vehicle, are connected to primary bus 34. All DC-operated accessories are likewise connected to primary bus 34. Operation of this configuration of power system 10 is otherwise as previously described.

With reference to FIG. 1B, with appropriately rated bidirectional DC/DC converters 20, 22, alternator 12 power can be supplied to or from any of high voltage bus 16, primary bus 34 and secondary bus 24. Thus, a high- or low-voltage alternator 12 may be used in system 100. For example, if a high voltage alternator 12 is used, the rectified voltage output from rectifier 14 is connected directly to high voltage bus 16, as shown in FIG. 1B. If a low voltage alternator is used, the output of rectifier 14 may be directly connected to primary bus 34. In this configuration, power for inverter 18 is supplied to high voltage bus 16 via bidirectional DC/DC converter 20 in the manner previously described. Alternatively, rectifier 14 may be connected directly to secondary bus 24. In this configuration the power is supplied to primary bus 34 through bidirectional DC/DC converter 22 and, in turn, to high voltage bus 16 through bidirectional DC/DC converter 20.

If there is insufficient power to start the vehicle's prime mover from cranking battery 30, power may be fed into system 100 via multiple buses from an external source, such as another vehicle that typically supplies power of a suitable voltage and current to battery 30 directly. Alternatively, AC power from an external source may be fed back into the AC bus 28 or a shore power input 21 of a bidirectional configuration of inverter 18, where it is rectified and then routed through DC/DC converters 20, 22 to charge battery 30. If DC/AC inverter 18 and DC/DC converters 20, 22 have sufficient capacity, the external AC power may also be used to start the vehicle's engine.

If DC/DC converter 20 is bidirectional, it can also provide support for alternator 12 when high voltage bus 16 is heavily loaded and further allow operation of system 100 from either or both of batteries 30, 32 when alternator 12 is not providing power. For example, DC/DC converter 20 can be configured to supply additional power from battery 32 to high voltage bus 16 in the manner previously described to augment power being supplied to the high voltage bus by alternator 12 during periods of heavy high voltage bus loading, thus maintaining the voltage level of the high voltage bus.

If inverter 18 is bidirectional, the inverter can rectify AC power, supplied externally to the inverter through AC bus 28 or shore power 21, to DC and supply the DC power to primary bus 34. Charging of battery 32 may be accomplished through DC/DC converter 20 in the manner previously described. Battery 30 may, in turn, be charged in the manner previously described through DC/DC converter 22, which is connected to primary bus 34. Thus, when external AC power is connected to inverter 18 the external AC voltage may be rectified by the inverter and supplied to high voltage bus 16 to provide power to DC/DC converters 20, 22 and charge batteries 30, 32 as well as supply power to primary bus 34 and secondary bus 24 in the manner previously described.

Figure 2:
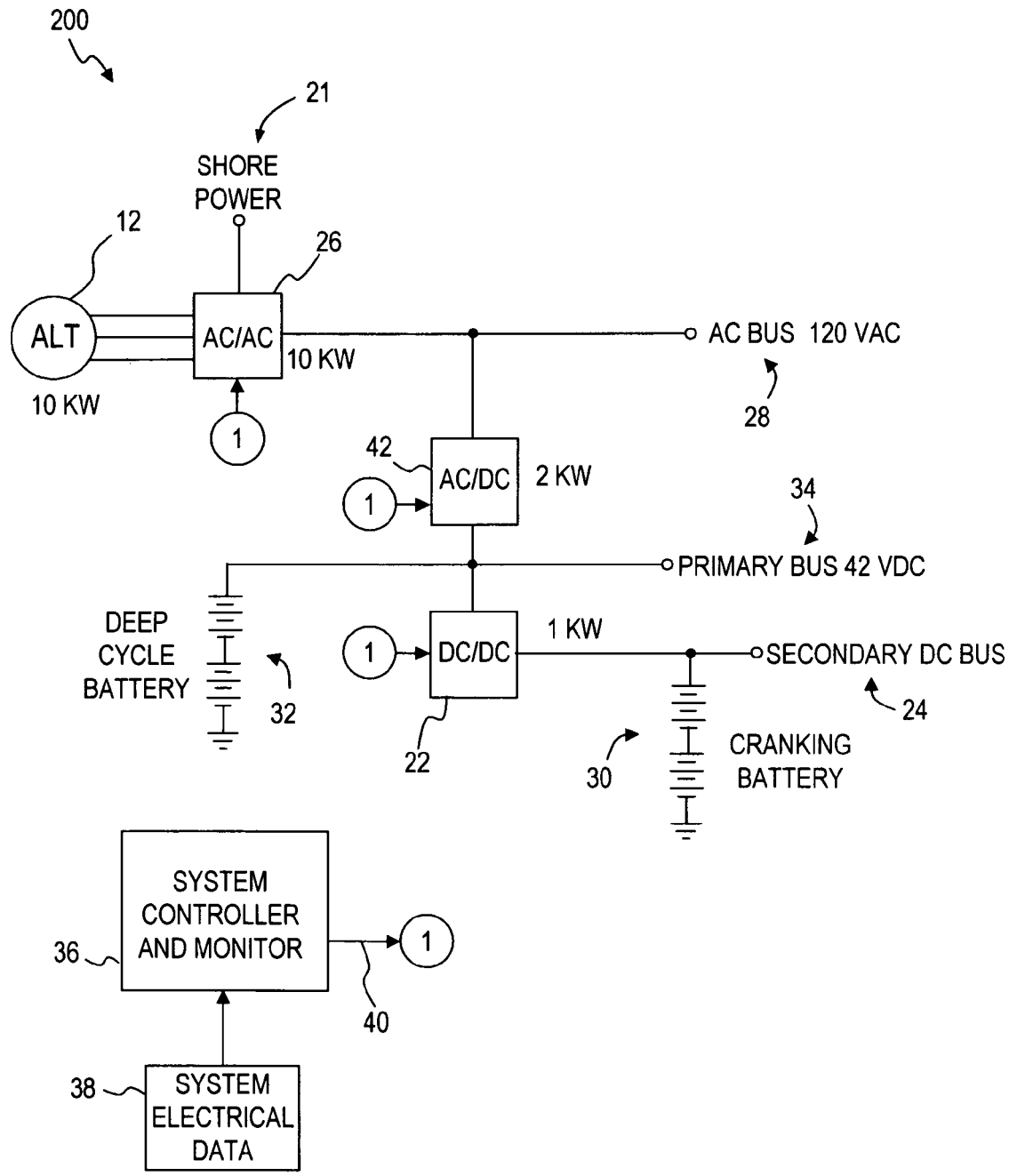
FIG. 2 is a schematic block circuit diagram of a power management system having a power conversion topology according to yet another embodiment of the present invention.

With reference to FIG. 2, a power management system 200 according to another embodiment of the present invention is shown in FIG. 2. An AC to AC ("AC/AC") converter 26 directly receives high voltage AC from an alternator 12 and converts the AC input to an AC bus 28 having a predetermined voltage and frequency. An AC to DC ("AC/DC") converter 42 is connected to bus 28 and converts the AC voltage to a predetermined DC voltage appropriate for charging a first battery 32 and providing power to a primary bus 34. A DC/DC converter 22 receives input power from primary bus 34 and converts the input power to a DC voltage and current suitable for charging a second battery 30 and providing power to a secondary bus 24. A system controller 36 utilizes system data to control the operation of the system via an output 40 in substantially the same manner as previously described.

AC/DC converter 42 receives input power from AC bus 28 and converts the input power to a DC voltage and current suitable for supply to primary DC bus 34 and battery 32. This operational mode can be used to add capacity to battery 32 in order to supply primary bus 34 (and secondary bus 24 through DC/DC converter 22) during conditions where the available DC power capacity is significantly less than the available AC power capacity. In addition, AC/DC converter 42 may be configured as a bidirectional converter to augment the AC power supplied by AC/AC converter 26. In this mode DC power is supplied as an input to AC/DC converter 42 by battery 32 and/or by battery 30 through a bidirectional DC/DC converter 22. Alternatively, an external source of power may be connected to at least one of buses 24, 34. The AC output of bidirectional AC/DC converter 42 is synchronized to AC bus 28 and the AC output of converter 42 is adjusted in direct proportion to the load to augment the capacity of AC/AC converter 26 and aid to maintain AC output voltage 28 under load. A direct AC/AC converter 26 may be lower cost as compared to a configuration having cascaded AC/DC and DC/AC converters, depending upon the type of converter suitable for a particular alternator 12. In addition, a bidirectional AC/AC converter 26 can provide starting or mechanical assist for the prime mover (not shown). Modulation of the alternator 12 field, synchronized with AC bus 28, may also provide performance improvement and simplification of the AC/AC converter 26. The topology depicted in FIG. 2 moves the converter supplying the primary DC bus to the output of the main AC converter which is most beneficial if the available DC power is significantly lower than the AC power.

In contrast to the systems 10, 100 of FIGS. 1A and 1B, system 200 of FIG. 2 is configured such that AC bus 28 can be sourced from both AC/AC converter 26 and bidirectional AC/DC converter 42 simultaneously so that they can share the load for a limited time. Thus, the capacity of AC bus 28 can be greater than the capacity of alternator 12 alone. In various embodiments converters 26 and 42 may each be sized to share at least a portion of an AC load separately and/or in combination.

As compared to systems 10, 100 of FIGS. 1A and 1B respectively, system 200 utilizes a direct AC/AC converter 26, which can be lower in cost as compared to a cascaded AC/DC and DC/AC topology if it is designed with an appropriate alternator 12. This is because components, such as silicon controlled rectifiers ("SCRs"), used in AC/AC converters are relatively low-cost. However, to achieve relatively high system 200 performance a high-frequency alternator 12 is preferred. Good power quality is more difficult to achieve in such configurations, though, due to the relatively low switching frequency of thyristors such as SCRs, particularly if natural commutation (i.e., switching of thyristors at the AC line frequency) is utilized to keep costs low.

AC/AC converter 26 can also provide starting or mechanical assist power for the prime mover (not shown) if it is bidirectional. In this configuration, AC power from an external source is connected to AC bus 28 and/or shore power 21. Alternatively, AC power may be supplied to AC bus 28 by AC/DC converter 42 configured to convert DC power input from the primary bus 34 to an AC output connected to the AC bus.

Modulation of the alternator 12 field, if synchronized with AC bus 28, provides a performance improvement and simplification of AC/AC converter 26 by reducing the depth of modulation required from a power converter switching portion (not shown) of the AC/AC converter. In this mode the source voltage provided by AC/AC converter 26 rises and falls as the AC output voltage 28 rises and falls, thus following the sine wave of the output. Reduced depth of modulation reduces output filtering requirements to achieve a desired power quality and also reduces the switching speed required for the switching components.

Figure 3:
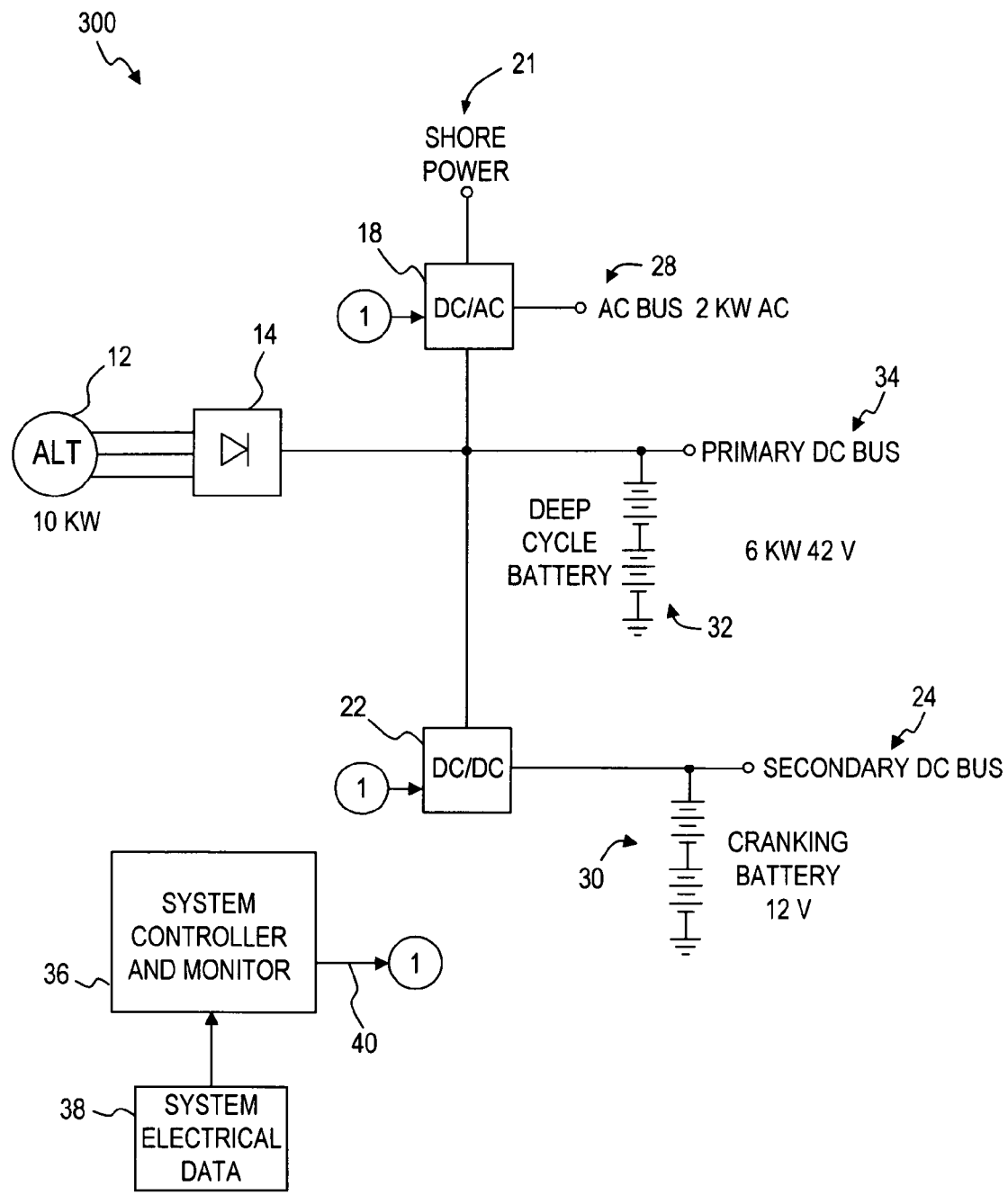
FIG. 3 is a schematic block circuit diagram of a power management system having a power conversion topology according to still another embodiment of the present invention.

Referring next to FIG. 3 a power management system 300 according to another embodiment of the present invention is shown therein. AC voltage from an alternator 12 is rectified to a DC voltage by a rectifier 14. The rectified DC forms a primary bus 34 in conjunction with a first battery 32. A DC/AC converter 28 receives input power from primary bus 34 and provides an AC output to an AC bus 28 to supply loads connected to the primary bus. A DC/DC converter 22 also receives input power from primary bus 34. An output of DC/DC converter 22 forms a secondary bus 24 in conjunction with a second battery 30. A system controller 36 utilizes system data 38 to control the operation of DC/AC converter 18 and DC/DC converter 22 via an output 40 in substantially the same manner as previously described.

Power management system 300 is preferred for vehicle configurations where most of the available power is consumed at a low DC voltage (e.g., 12 VDC, etc.) or where there is a cost benefit or other advantage to using a more conventional low-voltage alternator 12. In this configuration system 300 requires minimal additional control and/or power conversion electronics. A bidirectional DC/AC converter 18 may be provided to charge battery 32 directly, and charge battery 30 through DC/DC converter 22. If power from alternator 12 is unavailable (such as when the prime mover is not operating), battery 32 may power primary bus 34 and DC/AC converter 18, and can charge battery 30 through DC/DC converter 22. If a source of external AC power is available at AC bus 28 and/or shore power input 21, a bidirectional configuration of DC/AC converter 18 may receive the AC power and rectify it to DC to power primary bus 34, charge battery 32, power the secondary bus 24 through DC/DC converter 22, and charge battery 30.

With regard to power management systems 10, 100, 200, 300 (FIGS. 1A, 1B, 2 and 3), the preferred configuration is one that requires a minimum amount of power conversion to supply the needed voltages and capacities of DC and AC power for a particular vehicle and where much of the power generation is performed at a voltage that is suitable for powering most of the vehicle's loads. For example, if many of the loads connected to the power management system operate at 42 VDC, then power is preferably generated at 42 VDC to minimize the amount of power conversion needed to supply the loads. Minimizing the amount and type of power conversion also reduces system cost by minimizing the size and number of converters and associated control elements.

Figure 4A:
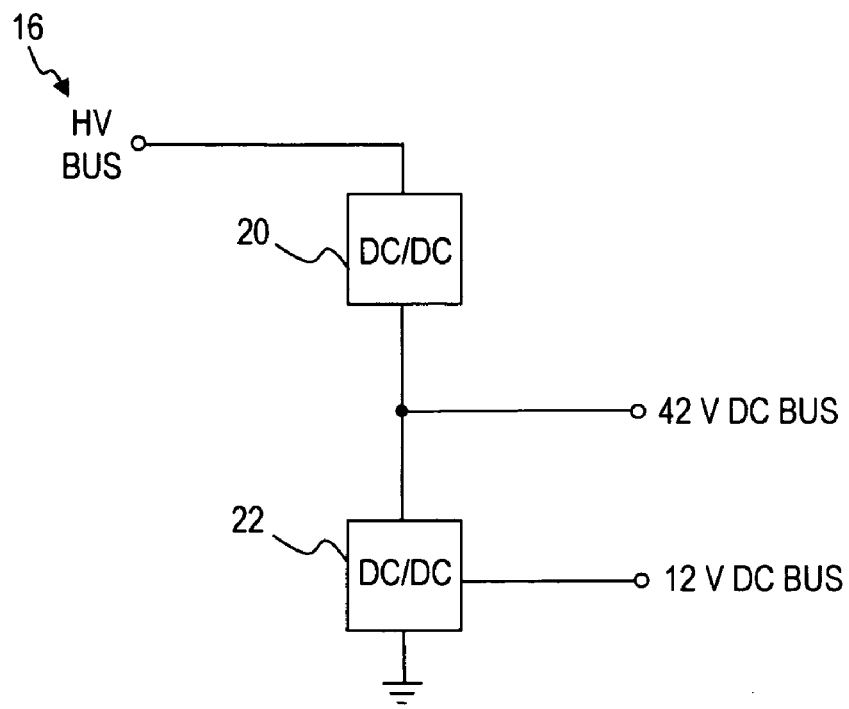
FIG. 4A is a schematic block circuit diagram focusing on a cascaded DC/DC power conversion topology for a power management system according to an embodiment of the present invention.
Figure 4B:
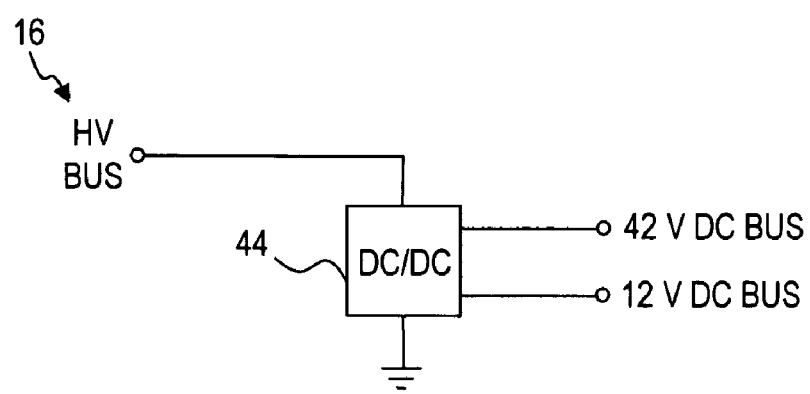
FIG. 4B is a schematic block circuit diagram focusing on a multiple-output DC/DC power conversion topology for a power management system according to another embodiment of the present invention.

The systems of FIGS. 1A, 1B, 2 and 3 may include multiple DC buses, or a single bus or dual bus. Where there are more than two DC buses, some consolidation of the DC/DC converters can be made, as shown in FIGS. 4A and 4B. One embodiment of inverter and converters is a "universal" reconfigurable converter that is capable of providing multiple outputs, or has outputs that can be adjusted to different voltage and/or current levels. A power management system for a particular vehicle can thus be customized for a particular need or easily modified to accommodate new needs by appropriate selection of settings and/or outputs of the reconfigurable converter. A reconfigurable inverter or converter obviates the need to produce many different custom configurations of inverters and converters, thus driving high production volumes for the reconfigurable devices. The high volumes can result in reduced component and manufacturing costs for the inverters and converters, resulting in a lower power management system cost.

The reconfigurable inverters and converters can use multiple switching stages, one for each bus interface and operating from separate windings on a common transformer. Each switching stage for a reconfigurable inverter or converter may include a rectifier for uni-directional power conversion, or a combination of active devices to achieve bidirectional conversion. A particular benefit of utilizing a plurality of reconfigurable inverters and converters is that changes in the need for a particular voltage and/or current is less likely to significantly impact the configuration of the power management system as a whole. This approach is thus advantageous for lower-volume, mass customization situations.

FIGS. 4A and 4B depict example topologies for providing low-voltage DC electrical power buses from a high-voltage bus. In FIG. 4A, electrical power from a high-voltage bus 16 is supplied to a first DC/DC converter 20. The output of DC/DC converter 20 is a low-voltage bus, such as a 42 VDC bus. The 42 V bus may be utilized as a voltage input for a cascaded second DC/DC converter 22, to provide an additional low-voltage bus, such as a 12 VDC bus.

Figure 5:
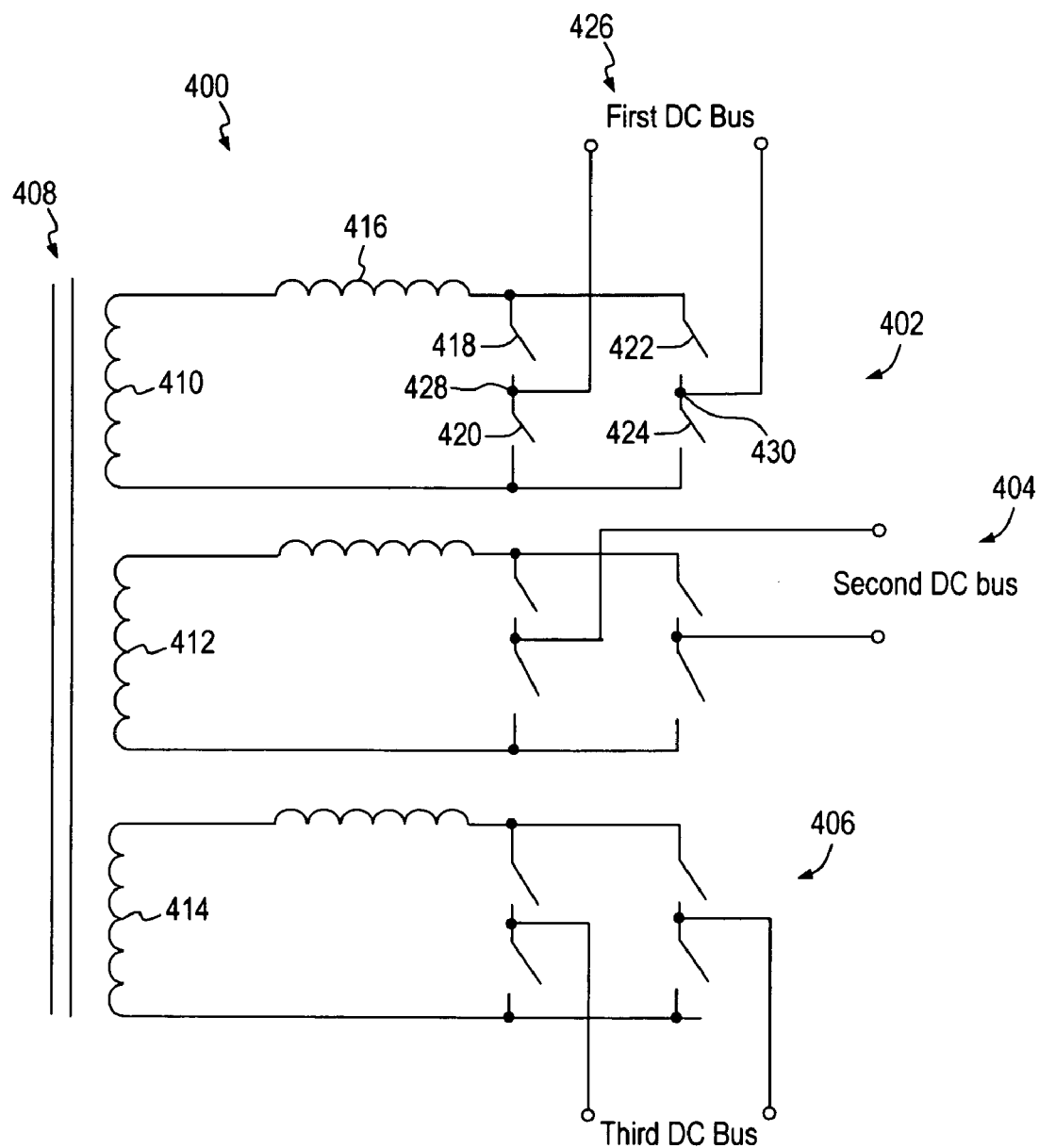
FIG. 5 is a schematic block diagram of an example switching circuit for the DC/DC converter topology of FIG. 4B.

In the topology shown in FIG. 4B, a plurality of low-voltage buses may be provided by a single DC/DC converter assembly 44 having a high-voltage input 16. An example switching converter arrangement 400 for DC/DC converter assembly 44 is shown in FIG. 5. In this arrangement switching converter 400 includes a plurality of converter bus modules 402, 404, 406 coupled together by a transformer 408 having three inductively coupled windings 410, 412, 414.

In a first configuration, bus module 402 functions as a power input device for converter assembly 44 (FIG. 4B). Module 402 includes winding 410, an inductor 416 and four switches 418, 420, 422 and 424 arranged as a full-bridge switching converter. DC power from a first bus 426 is supplied to junction points 428, 430 and is converted to AC by periodically actuating paired switches 418, 424 and then paired switches 420, 422 in an alternating, mutually exclusive fashion. The resulting AC current flows through winding 410 and inductor 416, inductively coupling AC current into windings 412 and 414. Modules 404 and 406 may be configured to function as a power input device in a like manner, and thus will not be separately described.

In a second configuration bus module 402 can function as a power output device for converter assembly 44. In this configuration AC power generated by either module 404 or 406 is coupled to winding 410 through transformer 408. One of switch pairs 418, 420 and 422, 424 are activated to couple the AC power to the DC bus where it is rectified and filtered as needed, and made available to the vehicle electrical system. Each of switches 418, 420, 422 and 424 may be selectively actuated to route power to/from the bus, and may function as a half-bridge or full-bridge switching converter in conjunction with inductor 46. Switches 418–424 may be pulse width modulated as desired to control and regulate the voltage and/or current delivered to the bus. Modules 404 and 406 function in a like manner to module 402, and thus will not be separately described.

In operation, any one of modules 402, 404, 406 may be selectively configured as a power input device while the remaining two modules function as output devices to supply power buses.

With regard to FIGS. 1A–4A, DC/DC converters 20, 22 and AC/DC converter 42 may each optionally include a conventional battery isolator and/or a battery equalizer to control charging and discharge of cells within batteries 30, 32. Additionally, power management controls may be utilized to control the preferential charging of one of batteries 30, 32.

Figure 6:
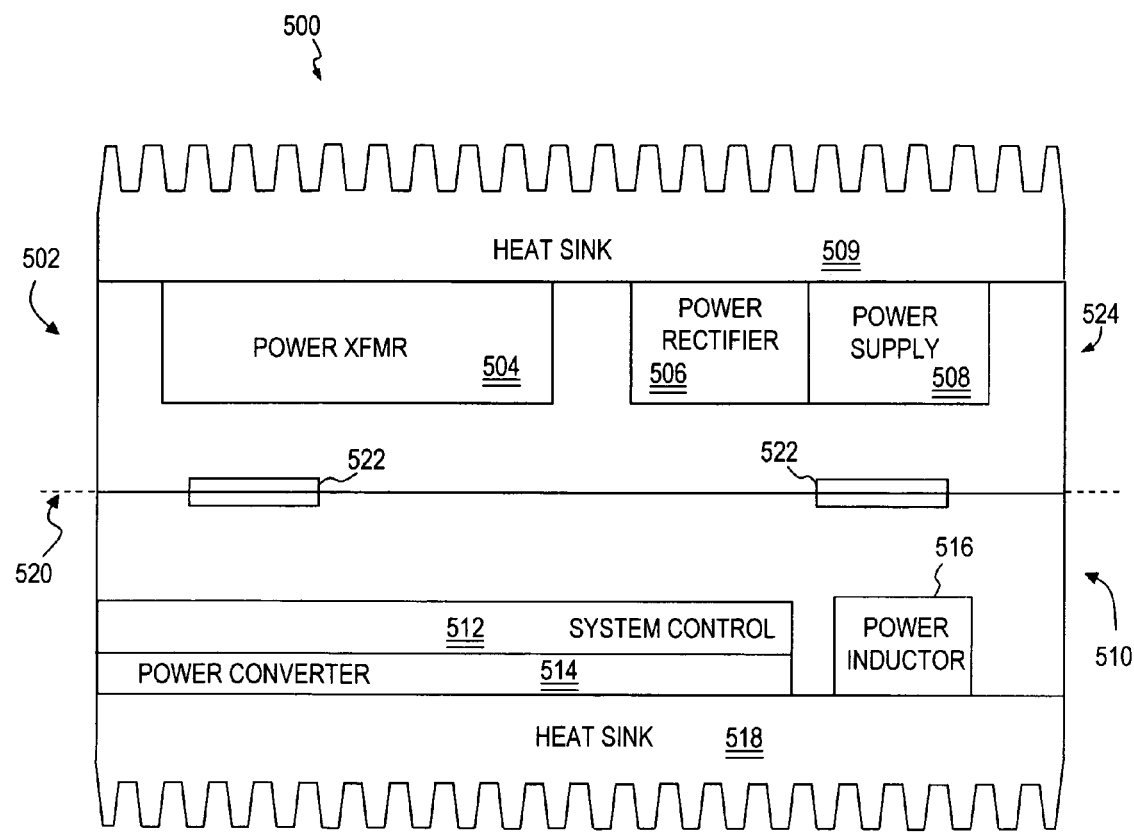
FIG. 6 is a top plan view of the general layout of the components of a power converter according to an embodiment of the present invention.

An example general arrangement 500 for the construction of any or all of inverters and converters 18, 20, 22, 26, 42 and 44 is shown in FIG. 6 according to an embodiment of the present invention. A first portion 502 comprises such components as a power transformer 504, rectifiers 506, a power supply 508 (such as, for example, for alternator field excitation) and a heat sink 509 to cool heat-generating portions of the components. A second portion 510 includes such components as a system control 512, a power converter stage 514, a power inductor 516 and a second heat sink 518 to cool heat-generating portions of the components. The first and second portions 502, 510 may be logically and physically divided by a separation line 520.

FIG. 6 depicts an example top plan view of an inverter 18 or any of converters 20, 22, 26, 42, and is adaptable to accommodate any of the converters and inverters or portions thereof depicted in FIGS. 1–5. Portions 502, 510 dissipate approximately the same amount of energy, thus balancing the distribution of heat dissipation in an enclosure 524 and avoiding "hot spots." In addition, portions 502, 510 may be separately assembled and tested, since neither portion relies on components in the other for operation. A further advantage of this arrangement is that first portion 502 and second portion 510 may be operated in at least a limited capacity in the absence of each other, should the other portion fail or be removed from the vehicle. Lastly, interconnection between first and second portions 502, 510 may be accomplished by means of at least one connector 522, allowing for fast and simple engagement and disengagement of the first and second portions.

The inverter and/or converter arrangement 500 generally depicted in FIG. 6 facilitates efficient power supply operation, reduces manufacturing and assembly cost, and provides a flexible design for wider applicability in varying vehicle installations. The arrangement of components are integrated into a unitary system, rather than an assembly of individual components. The arrangement also provides a benefit in the expected operability of the inverter or converter if non-essential portions can be removed separately in the event that they fail, leaving the remaining operable portions to support in at least a limited manner the operation of the power management system. Hence, the more complex inverter or converter and associated controls can be mounted in a separate mechanical assembly which can be easily removed in the event of a failure and the remaining system can be used to support operation of the vehicle.

As can be seen from the foregoing discussion, recharging of the vehicle battery via a DC and/or AC converter allows an extra degree of control, allowing alternator operation to be segregated from the battery charge function. This architecture can be utilized to provide a rapid recharge of the battery without over-charging, by using a profiled voltage. At the same time the alternator can be operated at an optimum voltage for inverter efficiency, if an inverter is in the system. Alternatively, another optimum voltage may be selected such as for compatibility with one or more loads, thus optimizing fuel efficiency and minimizing wear of an alternator belt and the alternator itself, thus increasing the reliability of the vehicle electrical system. An advantage of operating the vehicle electrical system at higher voltage levels is that smaller wire gauges may be used to connect loads to the system, reducing weight and simplifying wire routing.

It should be noted that particulars of power conversion from AC to DC, DC to DC and DC to AC have been omitted from the foregoing discussion, since various techniques for accomplishing such conversions are well-known in the art and are all applicable to the present invention. Likewise, particulars of the control portions, which can comprise digital and/or analog controls and may further include predetermined instructions such as computer programs, are also well-known in the art and are all applicable to the present invention. Thus, details for devising power inverters, power converters and control systems are left to the artisan.

While this invention has been shown and described with respect to a detailed embodiment thereof, it will be understood by those skilled in the art that changes in form and detail thereof may be made without departing from the scope of the claims of the invention.

What is claimed is:

1. A power management system for a vehicle, comprising:
   a first DC bus;
   a DC to AC inverter connected between the first DC bus and an AC bus;
   a first DC to DC converter connected between the first DC bus and a battery, wherein the first DC to DC converter and the battery are further directly connected to a second DC bus;
   a second DC to DC converter connected between the second DC bus and a third DC bus; and
   a control portion,
   wherein the control portion is responsive to the status of at least one of the first DC bus, DC to AC inverter, AC bus, first DC to DC converter, battery, second DC bus, second DC to DC converter and third DC bus to control the operation of at least one of the DC to AC inverter, first DC to DC converter and second DC to DC converter to at least one of supply and regulate at least one of the voltage and current of at least one of the AC bus, first DC bus, second DC bus and third DC bus.

2. The power management system of claim 1 wherein at least one of the DC to AC inverter, first DC to DC converter and second DC to DC converter are bidirectional.

3. The power management system of claim 2 wherein at least one of the AC bus, second DC bus, third DC bus and a shore power connection are used to supply power to the power management system in cooperation with at least one of the DC to AC converter, first DC to DC converter and second DC to DC converter.

4. The power management system of claim 1 wherein the first DC to DC converter and the second DC to DC converter are portions of a single converter assembly.

5. The power management system of claim 4 wherein the converter assembly further includes a plurality of converter bus modules coupled together by a common transformer, and wherein each bus module further includes an inductor and a plurality of electronic switches to at least one of supply and regulate at least one of the voltage and current of at least one of the AC bus, first DC bus, second DC bus and third DC bus.

6. The power management system of claim 1 wherein components of at least one of the DC to AC inverter, first DC to DC converter and second DC to DC converter are arranged in an enclosure to generally evenly distribute heat generated by the components between a first portion and a second portion, and wherein the components in the first portion and second portion are arranged such that one portion can continue to at least partially function if the other portion should fail or be removed from the system.

7. A power management system for a vehicle, comprising:
a first DC bus;
a DC to AC inverter connected between the first DC bus and an AC bus;
a first DC to DC converter connected between the first DC bus and a first battery, wherein the first DC to DC converter and the first battery are further directly connected to a second DC bus;
a second DC to DC converter connected between the second DC bus and a second battery, wherein the second DC to DC converter and the second battery are further directly connected to a third DC bus; and
a control portion,
wherein the control portion is responsive to the status of at least one of the first DC bus, DC to AC inverter, AC bus, first DC to DC converter, first battery, second DC bus, second DC to DC converter, second battery and third DC bus to control the operation of at least one of the DC to AC inverter, first DC to DC converter and second DC to DC converter to at leastone of supply and regulate at least one of the voltage and current of at least one of the AC bus, first DC bus, second DC bus and third DC bus.

8. The power management system of 7 wherein at least one of the DC to AC inverter, first DC to DC converter and second DC to DC converter are bidirectional.

9. The power management system of claim 8 wherein at least one of the AC bus, second DC bus, third DC bus and a shore power connection are used to supply power to the power management system in cooperation with at least one of the DC to AC converter, first DC to DC converter and second DC to DC converter.

10. The power management system of claim 7 wherein the first DC to DC converter and the second DC to DC converter are portions of a single converter assembly.

11. The power management system of claim 10 wherein the converter assembly further includes a plurality of converter bus modules coupled together by a common transformer, and wherein each bus module further includes an inductor and a plurality of electronic switches to at least one of supply and regulate at least one of the voltage and current of at least one of the AC bus, first DC bus, second DC bus and third DC bus.

12. The power management system of claim 7 wherein components of at least one of the DC to AC inverter, first DC to DC converter and second DC to DC converter are arranged in an enclosure to generally evenly distribute heat generated by the components between a first portion and a second portion, and wherein the components in the first portion and second portion are arranged such that one portion can continue to at least partially function if the other portion should fail or be removed from the system.

13. A power management system for a vehicle, comprising:
an AC to AC converter connected between an AC power source and an AC bus;
an AC to DC converter connected between the AC bus and a first battery, wherein the AC to DC converter and the first battery are further directly connected to a first DC bus;
a DC to DC converter connected between the first DC bus and a second battery, wherein the DC to DC converter and the second battery are further directly connected to a second DC bus; and
a control portion,
wherein the control portion is responsive to the status of at least one of the AC power source, AC to AC converter, AC bus, AC to DC converter, first battery, first DC bus, DC to DC converter, second battery, and second DC bus to control the operation of at least one of the AC to AC converter, AC to DC converter, and DC to DC converter to at least one of supply and regulate at least one of the voltage and current of at least one of the AC bus, first DC bus and second DC bus.

14. The power management system of claim 13 wherein at least one of the AC to AC converter, AC to DC converter, and DC to DC converter are bidirectional.

15. The power management system of claim 14 wherein at least one of the AC bus, first DC bus, second DC bus and a shore power connection are used to supply power to the power management system in cooperation with at least one of the AC to AC converter, AC to DC converter and DC to DC converter.

16. The power management system of claim 13 wherein components of at least one of the AC to AC converter, AC to DC converter and DC to DC converter are arranged in an enclosure to generally evenly distribute heat generated by the components between a first portion and a second portion, and wherein the components in the first portion and second portion are arranged such that one portion can continue to at least partially function if the other portion should fail or be removed from the system.

17. A power management system for a vehicle, comprising:
a DC to AC inverter connected between a DC power source and an AC bus;
a first battery connected to the DC power source, wherein the first battery is further directly connected to a first DC bus;

a DC to DC converter connected between the first DC bus and a second battery, wherein the DC to DC converter and the second battery are further directly connected to a second DC bus; and a control portion, wherein the control portion is responsive to the status of at least one of the DC power source, DC to AC inverter, AC bus, first battery, first DC bus, DC to DC converter, second battery and second DC bus to control the operation of at least one of the DC to AC inverter and the DC to DC converter to at least one of supply and regulate at least one of the voltage and current of at least one of the AC bus, first DC bus and second DC bus.

18. The power management system of claim 17 wherein at least one of the DC to AC inverter and the DC to DC conVerter are bidirectional.

19. The power management system of claim 18 wherein at least one of the AC bus, first DC bus, second DC bus and a shore power connection are used to supply power to the power management system in cooperation with at least one of the DC to AC converter and the DC to DC converter.

20. The power management system of claim 17 wherein components of at least one of the DC to AC inverter and DC to DC converter are arranged in an enclosure to generally evenly distribute heat generated by the components between a first portion and a second portion, and wherein the components in the first portion and second portion are arranged such that one portion can continue to at least partially function if the other portion should fail or be removed from the system.

* * * * *